United States Patent [19]

Sullivan

[11] Patent Number: 4,937,063

[45] Date of Patent: Jun. 26, 1990

[54] BISMUTH VANADATE PROCESS

[75] Inventor: Robert M. Sullivan, Washington, Pa.

[73] Assignee: Ciba-Geigy Corporation, Ardsley, N.Y.

[21] Appl. No.: 298,215

[22] Filed: Jan. 17, 1989

Related U.S. Application Data

[63] Continuation of Ser. No. 87,077, Aug. 19, 1987, abandoned.

[51] Int. Cl.$^5$ .................... C01G 29/00; C08K 3/22; C09C 1/00
[52] U.S. Cl. .................................... 423/593; 106/479; 423/68
[58] Field of Search ................... 423/68, 593; 106/479

[56] References Cited

U.S. PATENT DOCUMENTS

| | | | |
|---|---|---|---|
| 4,063,956 | 12/1977 | Higgins | 106/288 B |
| 4,251,283 | 2/1981 | Balducci et al. | 106/288 B |
| 4,316,746 | 2/1982 | Rustioni et al. | 423/593 |

OTHER PUBLICATIONS

Chemical Engineering Techniques, Lauer et al., Reinhold Publishing Corp., 1952, p. 301.

*Primary Examiner*—Jeffrey E. Russel
*Attorney, Agent, or Firm*—Harry Falber

[57] ABSTRACT

An improved solid state process for the preparation of compounds based on bismuth vanadate wherein the improvement comprises subjecting the reaction product to wet grinding in alkaline solution or to sequential wet grinding and alkaline treatment, said process modification resulting in the preparation of bright, high tinting yellow pigments.

9 Claims, No Drawings

BISMUTH VANADATE PROCESS

This application is a continuation, of application Ser. No. 087,077, filed 8/19/87, now abandoned.

Bismuth vanadates have been identified as pigmentary, yellow compounds applicable for coloring plastics and paints (see U.S. Pat. Nos. 4,115,141 and 4,115,142). A variety of precipitation and solid state reactions have also been disclosed for preparing such bismuth vanadates and related compounds. For example, prior to discovery of the indicated pigmentary properties, Gottlieb et al, Therm. Anal. Fourth ICTA, Budapest, 1, 675-679 (1974) describe synthesis of bismuth vanadates by solid state preparations wherein intimately mixed bismuth and vanadium oxides are heated at 800° C. for 16 hours and by precipitation methods wherein solutions of sodium vanadate and bismuth nitrate are reacted at controlled concentrations, temperatures, time and pH. Correspondingly, Roth et al, Amer. Mineral. 48, 1348–1356 (1963) disclose solid state approaches involving heating of the mixed oxides.

In addition, the approach of the above noted U.S. patents involves first precipitating a gel-like precursor from soluble bismuth and vanadium compounds, and then converting the precursor into the crystalline, pigmentary form either by a heat treatment at 200°-500° C. or by an aqueous aftertreatment carried out under specified conditions.

Alternate approaches are disclosed in German Nos. 3,315,850, 3,315,851, U.S. Pat. Nos. 3,843,554 and 4,063,956. In addition, U.S. Pat. No. 4,316,746 describes bismuth vanadate/molybdate and bismuth vanadate/tungstenate pigments which consist in the case of bismuth vanadate/molybdate of a crystalline phase having a scheelitelike structure, while in the case of bismuth vanadate/tungstenate a two-phase product is present.

A bismuth vanadate/molybdate or bismuth vanadate/tungstenate was also proposed in U.S. Pat. No. 4,455,174 and German No. 3,221,338 as a further alternative yellow pigment. These are multiphase products which consist of a bismuth vanadate phase and a bismuth/molybdate and/or a bismuth/tungstenate phase and which are prepared by a process in which a solution containing a bismuth salt, a vanadate and a molybdate is acidified, then treated with an alkaline solution optionally containing the tungsten compound, whereupon the solids are recovered, washed and optionally dried and heat treated at 300°-800° C.

These diverse processes have, however, exhibited certain disadvantages. A key disadvantage of the solid state processes is noted in the calcined mass wherein a dull yellow brown color or a dirty green color is frequently encountered. Such a reduction in the desired bright yellow color has, in turn, a significant impact on the use of these materials in pigment-related applications. Although the use of oxidizing agents in certain of the prior art processes has served to minimize this effect, many of the oxidizing agents produce noxious off-gases. A further disadvantage of certain of these processes is the need for a multiplicity of steps including precipitation, calcining, and the like.

Accordingly, it is the primary advantage of the invention to develop an improved solid state process for the preparation of pigmentary-quality bismuth vanadate compounds.

It is a further object to provide such a process which substantially eliminates the adverse color effects on the desired bright yellow color of these compounds.

Various other objects and advantages of this invention will become apparent from the following descriptive material.

It has now been surprisingly discovered that by subjecting the calcined bismuth vanadate compounds to a procedure where the compound is wet ground in the presence of an alkaline material or is treated with the alkaline material subsequent to wet grinding, the disadvantages of the prior art approaches have been substantially eliminated. Thus, the off-color is believed to be attributable to the presence of the excess vanadium frequently utilized in order to insure complete bismuth reaction and/or to the presence of lower valent vanadium, namely, trivalent and pentavalent vanadium. The instant process thus serves to convert these contaminants to the soluble and readily removable alkali vanadate form in order to obtain the desired color. In addition, the process allows for the use of low cost raw materials and for relatively simple operation particularly in the combined alkaline-wet grinding procedure. Finally, the process is applicable to a wide variety of bismuth vanadate compounds, including bismuth vanadate and bismuth vanadates containing a broad range of bismuth and vanadium replacement ions. The key end result is the preparation of bright yellow pigmentary bismuth vanadate compounds.

The bismuth vanadate compounds applicable for preparation according to the instant process comprise bismuth vanadate and single phased bismuth vanadate compounds resulting from the incorporation of various precursor materials or the solubilization of various $ADO_4$ compounds therein. These compounds may be depicted by the general formula

$ADO_4$ wherein A represents trivalent bismuth alone or cation combinations of bismuth and at least one other cation; and D represents pentavalent vanadium alone or cation combinations of vanadium and at least one other non-A cation; the applicable cations being compatible with the pigmentary properties of the resulting product.

Typical bismuth replacement cations include alkaline earth metals and zinc, while typical vanadium replacement cations include molybdenum and tungsten.

A sub-group within the above noted formula corresponds to the formula

$(Bi,E)(V,G)O_4$ wherein E is an alkaline earth metal, zinc or mixtures thereof, and G is molybdenum, tungsten or mixtures thereof, the molar ratio of E:Bi being between 0.1 and 0.4 and the molar ratio of G:V being between 0 and 0.4. Molar ratios of 0.1–0.3 for each are preferred. The (Bi,E) and (V,G) notations are to be understood as meaning that bismuth is partly replaced by one or more E cations and that vanadium can be partly replaced by one or more G cations.

The latter compounds are more fully described in U.S. application Ser. No. 016,045, filed Feb. 18, 1987, now U.S. Pat. No. 4,752,460, and the appropriate sections thereof are incorporated herein.

The pre-calcining and calcining operations are well-known to those skilled in the art, as particularly identified in certain of the aforementioned publications. The applicable processes include solid state reactions at elevated temperatures starting from the corresponding metal oxides. As noted, the usual method is to calcine mixtures of oxides, or any salt which yields the corresponding oxide by thermal decomposition, e.g., carbonates, nitrates oxalates, hydroxides, etc., in the proper ratios for the desired composition. Calcining temperatures vary from about 300° to about 950° C. The optimum temperature depends upon the particular composition being prepared. Higher temperatures are preferred in order to facilitate reaction and to assure a homogeneous product. A critical upper limit for calcining temperatures is imposed by the formation of a liquid phase.

The time of calcination is not critical; times of 1 to 100 hours may be used, but 4–48 hours is preferred. Longer times are required at lower temperatures. Calcining times may be shortened and homogeneity of the products improved by regrinding between periods of heating.

The improved process steps of the invention involve subjecting the calcined product to wet grinding in the presence of an alkaline material or wet grinding followed by alkaline treatment. Thus, subsequent to calcining, the product is discharged and cooled to room temperature. Wet milling will generally be conducted in a pebble, ball, microball or sand mill for a period of time sufficient to achieve pigmentary particle size. The alkaline material is added as an aqueous solution to provide the wet milling environment. The alkaline material will generally be introduced at the onset of the milling operation, although it may also be added in solution during milling such that it is in contact with the calcined material for sufficient time to form the alkali vanadate.

An operable but less preferred approach involves stirring the milled material in an alkaline solution at room temperature for a sufficient period of time for salt formation.

Applicable alkaline materials include alkali metal hydroxides and carbonates, preferably sodium and potassium materials, and alkaline earth metal hydroxides, carbonates and oxides, preferably magnesium materials. The alkaline materials are added in sufficient amount to provide a pH value of from about 7.0–13.0 to the pigment-containing slurry, and preferably a pH value of 9.5–12.0.

Finishing operations for the resulting material will include filtration, washing to remove soluble salts and drying, for example, at 100°–110° C. Subsequent dry grinding may also be an option.

The resulting bismuth vanadate compounds exhibit quality pigmentary properties, particularly the desired bright yellow color and high tinting capability. They are highly suited for pigmenting a wide variety of high molecular weight organic materials, including resins, oils and organic polymers. They can be incorporated into lacquers, paints and printing inks.

To improve certain pigment properties, the prepared compounds can additionally be treated with texture-improving agents, for example with long-chain aliphatic alcohols, esters, acids or salts thereof, amines, amides, waxes or resinous substances, such as abietic acid, hydrogenation products, esters or salts thereof, further with nonionic, anionic or cationic surface-active agents.

The following examples further illustrate the embodiments of the invention. In these examples, all parts given are by weight unless otherwise indicated.

EXAMPLE 1

Bismuth oxide (46.6 parts) and vanadium pentoxide (18.2 parts) are wet milled, dried and heated at 778° C. for four hours. The resulting calcined material is thereafter introduced into a pebble mill together with sufficient sodium hydroxide solution to provide a pH in the area of 9.5 to the system and milling is conducted until pigmentary particle size is attained. The resulting product is then washed and dried. The product exhibits a bright yellow color.

Pigmentary qualities are determined utilizing rubout in an acrylic lacquer and subsequent color readings utilizing a colorimeter. In each case, 22.8 parts of dry pigment and 100 parts of lacquer are prepared as an ink dispersion, referred to as the masstone ink, and drawn down. In order to assess color strength, 11.4 parts of pigment and 11.4 parts of pigmentary titanium dioxide are blended and drawn down. The results noted below are obtained utilizing L, a, b colorimeter measurements wherein "L" refers to lightness, "a" refers to red-green ratio with "+a" denoting redness and "−a" denoting greeness, and "b" refers to yellow-blue ratio with "+b" denoting yellowness and "−b" denoting blueness.

|   | Masstone | Tint |
|---|---|---|
| L | 82.2 | 88.3 |
| a | −8.6 | −11.0 |
| b | +50.1 | +42.9 |

These data thus indicate the quality pigmentary properties of the resulting pigment.

EXAMPLE 2

The following pigments are prepared according to the general procedure of Example 1.

|  | PARTS | | |
|---|---|---|---|
|  | b | c | d |
| Bismuth subnitrate | 40.15 | — | — |
| Bismuth oxide | — | 46.6 | 46.6 |
| Vanadium pentoxide | 9.10 | 18.2 | 18.2 |
| Molybdic oxide | 3.7 | 7.5 | 3.75 |
| Calcining temp. (°C.) | 667 | 778 | 778 |
| Calcining time (hrs.) | 4 | 4 | 4 |
| pH value | 9.5 | 9.5 | 9.5 |
| Color | bright yellow | bright yellow | bright yellow |

Summarizing, it is seen that this invention provides an improved process for preparing pigmentary bismuth vanadate compounds. Variations may be made in procedures, proportions and materials without departing from the scope of the invention as defined by the following claims.

What is claimed is:

1. In the process for the preparation of bismuth vanadate and bismuth vanadate-containing compounds wherein the precursor materials are calcined in the solid state at temperatures sufficient to react the precursor materials to prepare the vanadate compounds, the improvement consisting of the steps of wet grinding the calcined product, contacting the calcined product with sufficient alkaline material to provide a pH level of 7.0–13.0 and recovering the treated product, said wet grinding of the calcined product being conducted either in the presence of said alkaline material or prior to said contacting with said alkaline material.

2. The process of claim 1, wherein bismuth vanadate is prepared.

3. The process of claim 1, wherein bismuth vanadate-containing compounds are prepared, said compounds corresponding to the formula $$ADO_4$$

wherein A is bismuth or a cation combination of bismuth and at least one other cation;

D is vanadium or a cation combination of vanadium and at least one other non-A cation; at least one of A or D being a cation combination.

4. The process of claim 3, wherein A is an alkaline earth metal and D is molybdenum or tungsten.

5. The process of claim 3, wherein said compounds correspond to the formula $$(Bi,E)(V,G)O_4$$

wherein E is an alkaline earth metal, zinc or mixtures thereof, and G is molybdenum, tungsten, or mixtures thereof; the molar ratio of E:Bi being between 0.1 and 0.4 and the molar ratio of G:V being between 0 and 0.4.

6. The process of claim 1, wherein said calcined product is wet ground in the presence of the alkaline material.

7. The process of claim 1, wherein said alkaline material is an alkali metal hydroxide, alkali metal carbonate, alkaline earth metal hydroxide, alkaline earth metal carbonate or alkaline earth metal oxide.

8. The process of claim 7, wherein said alkaline material is an alkali metal hydroxide.

9. The process of claim 1, wherein said pH level is 9.5–12.0.

* * * * *